United States Patent [19]

Lemma

[11] Patent Number: 5,750,047
[45] Date of Patent: May 12, 1998

[54] ANTI-ICING FLUIDS

[75] Inventor: Solomon Lemma, Broadview Heights, Ohio

[73] Assignee: The B.F. Goodrich Company, Richfield, Ohio

[21] Appl. No.: 815,650

[22] Filed: Mar. 13, 1997

[51] Int. Cl.$^6$ .................................................... C09K 3/18
[52] U.S. Cl. ............................................ 252/70; 106/13
[58] Field of Search ................................ 106/13; 252/70

[56] References Cited

U.S. PATENT DOCUMENTS

| | | | |
|---|---|---|---|
| 2,923,692 | 2/1960 | Ackerman et al. | 260/17.4 |
| 4,358,389 | 11/1982 | König-Lumer et al. | 106/13 |
| 4,744,913 | 5/1988 | Salvador et al. | 252/70 |
| 5,118,435 | 6/1992 | Nieh | 106/13 |
| 5,268,116 | 12/1993 | Fusiak et al. | 252/70 |
| 5,268,117 | 12/1993 | Fusiak et al. | 252/70 |
| 5,334,323 | 8/1994 | Schrimpf et al. | 252/70 |
| 5,461,100 | 10/1995 | Jenkins et al. | 106/13 |

FOREIGN PATENT DOCUMENTS 2147046  10/1995  Canada.

OTHER PUBLICATIONS

SAE Aircraft Ground Deicing Conference. Jun. 15–17, 1993, Salt Lake City, Utah. P.R. Louchez et al., "A Facility for Evaluation of Aircraft Ground De/Anti–icing Products", pp. 1–9.

*Primary Examiner*—Anthony Green
*Attorney, Agent, or Firm*—George W. Moxon, II

[57] ABSTRACT

A composition for use as a de-icing fluid comprising a glycol based aqueous solution thickened with about 0.01 to about 5.0% by weight of a cross-linked hydrophobically modified copolymer of an acrylic acid which has a Brookfield mucilage viscosity of at least 25,000 cP at 0.5% by weight polymer dosage, a holdover time of at least 60 minutes, a shear thinning index of at least 20, and a shear loss of less than 15% and acceptable aerodynamic performance.

33 Claims, No Drawings

ANTI-ICING FLUIDS

BACKGROUND OF THE INVENTION

The present invention is related to thickened deicing or anti-icing fluids that are used to coat objects, such as aircraft, to prevent the formation of ice on the surface of the object, where the formation of the ice would interfere with the performance of the object. The present invention further is related to the use of cross-linked, carboxylic acid containing polymers and copolymers to provide improved anti-icing fluids.

Deicing fluids typically are comprised of a blend of water and ethylene glycol or propylene glycol, in a ratio that ranges from 50:50, water to glycol, to about 20:80. For the purpose of this application the terms deicing fluid and anti-icing fluid will be used interchangeably. These fluids are sometimes diluted with water in the end use to match the weather conditions. Deicing fluids melt the frost, snow, or ice which has accumulated on, for example, aircraft surfaces, while the aircraft is on the ground, as well as provide protection against further accumulation and/or refreezing when no further precipitation occurs. In the case of an aircraft, the formation of ice would change the aerodynamic flow characteristics of, for example, the wing of the aircraft and prevent its normal functioning. When these fluids are thickened, they will provide an extended period of protection against frost, snow, and ice, i.e., an extended holdover time, by remaining on the aircraft until take-off, and will come off the surfaces when the aircraft becomes airborne.

Deicing or anti-icing fluids have been classified as two types: unthickened and thickened. Unthickened deicing fluids are generally classified as Type I fluids, and are comprised of a blend of water and ethylene glycol or propylene glycol, in a ratio of about 20:80, water to glycol. They melt the frost, snow, or ice which has accumulated on the aircraft surfaces while the aircraft is on the ground. However, they do not provide adequate protection from further ice and snow formation. They mainly provide protection against refreezing when no precipitation conditions occur.

Thickened deicing or anti-icing fluids, which have a ratio of about 50:50, water to glycol, are classified as either Type II or Type IV deicing fluids. They prevent ice and snow from forming on aircraft surfaces that remain on ground for long periods of time before take-off, and will remain on the aircraft until take-off. The thickened fluid is applied on to the aircraft surfaces after snow and ice have been removed, and snow and ice will then form on the coating, not on the aircraft surfaces. The thickened deicing coating is then removed from the aircraft by the shearing action during take-off when the aircraft reaches about 70 m/sec or 157 miles per hour.

The difference between Type II and Type IV fluids is the amount of time they provide protection against frost, snow or ice build-up onto ground aircraft. This time is commonly known as the "holdover time". Type II fluids typically provide holdover time about 30 minutes, whereas Type IV fluids provide holdover time in excess of 80 minutes. Deicing fluids which provide a further extended period of protection against frost, snow, ice or an extended holdover time, are desirable.

The performance of deicing and anti-icing fluids are established through two key ISO standard tests, namely the Holdover Time Test, as measured by the Water Spray Endurance Test (or WSET), and the Aerodynamic Performance Test. The fluid has to pass both tests in order to be used as an anti-icing or deicing fluid for ground aircraft. As noted above, the holdover time requirement is 30 minutes for Type II fluid and 80 minutes for Type IV fluid. The Aerodynamic Performance and Holdover Time tests are conducted according to SAE (Society of Automotive Engineers)/AMS (American Metals Society) Test 1428A. The Aerodynamic Performance test is a pass/fail test, which is performed in a wind tunnel and assures that any residual fluid left on the wings, at the time of take off, will not interfere with the lift capability of the aircraft.

A number of patents disclose the use of thickened glycol deicing fluids which would be useful as Type II fluids, namely U.S. Pat. Nos. 4,358,389; 4,744,913; 5,118,435; 5,268,116; 5,268,117; 5,334,323; and Canadian Patent Application No. 2,147,046. U.S. Pat. No. 4,358,389 teaches the use of cross-linked polyacrylate thickeners having a viscosity of 1000 to 50,000 mPa (@0.5% concentration) and produces thickened fluids having holdover times of about 35 minutes. U.S. Pat. No. 4,744,913 teaches the use of two selected cross-linked polyacrylate polymers, i.e., a cross-linked sodium acrylate/acrylamide copolymer plus a cross-linked acrylic acid polymer and produces fluids having a holdover time of about 37 minutes. U.S. Pat. No. 5,118,435 teaches the use of a acrylic acid homopolymer with a acrylic acid copolymer to make a fluid having a holdover time of about 35 minutes. U.S. Pat. No. 5,268,116 teaches the use of a cross-linked maleic anhydride/$C_1$ to $C_2$ alkyl vinyl ether copolymer, while U.S. Pat. No. 5,268,117 teaches the use of a cross-linked poly (N-vinyl pyrrolidone) polymer, and these have holdover times in the 26 to 28 minutes range. U.S. Pat. No. 5,334,323 teaches the use of a cross-linked acrylic acid homopolymer in combination with a nonionic surfactant and achieves a holdover time of about 26 minutes. Canadian Patent Application No. 2,147,046 teaches the use of a cross-linked copolymer of (meth)acrylic acid and an ester or amide of (meth)acrylic acid and achieves a holdover time of about 34 minutes.

One U.S. Pat. No. 5,461,100 teaches the use of a polymer which achieves a holdover time of about 70 minutes. This patent teaches the use of a carboxylic acid polymer containing a monoethylenically unsaturated macro monomer. These types of polymers are a class of block copolymers which comprise a hydrophilic block and a hydrophobic block, and are not cross-linked. They function differently than the cross-linked acrylic acid polymers discussed above. They function as an associative thickener and not as a primary thickener.

SUMMARY OF THE INVENTION

The present invention has resulted from the discovery that improved glycol based aqueous solution compositions, for use as deicing fluids, can be achieved by using about 0.01 to about 5.0% by weight of a cross-linked, carboxylic acid polymer or copolymer, which has a Brookfield, mucilage viscosity of at least 25,000 centipoise (cP) at 0.5% by weight polymer dosage, and a shear thinning index (STI) of greater than 20 and a shear loss of less than 15% when used in the fluid. STI is the number ratio of the rheological properties or viscosity of the thickened deicing fluid at 0.3 rpm compared to the viscosity at 30 rpm and is predictive of the Aerodynamic Test result. It is a measure of the shear thinning nature of the composition. The improved fluids in accordance with the present invention will achieve a holdover time of more than 60 minutes and will pass the Aerodynamic Test. Preferably, the deicing fluids of the present invention achieve a holdover time of greater than 80 minutes and are useful as Type IV deicing fluids. The polymers of the present invention further are very effective in thickening propylene glycol based fluids.

The polymer of the present invention is the polymerization product of a carboxylic acid monomer and/or comonomer(s) which could be alkyl (meth)acrylate(s), with alkyl groups of $C_6$ to $C_{30}$, vinyl ester(s) of $C_1$ to $C_{30}$ aliphatic acids, or $C_1$ to $C_{30}$ (preferably $C_3$ to $C_{18}$) acrylamides. Preferred comonomers include lauryl methacrylate, isodecyl methacrylate, stearyl methacrylate, tertiary butyl acrylamide, tertiary octyl acrylamide, vinyl acetate, and vinyl esters of $C_1$ and $C_{20}$ aliphatic acids, alkyl vinyl ethers of $C_1$ to $C_{30}$. An effective amount of a cross-linking monomer, such as trimethylol propane diallyl ether, allyl acrylate, allyl pentaerythritol, allyl sucrose, methylene-bis-acrylamide, or mixtures thereof, will result in a cross-linked copolymer which will have a Brookfield, mucilage viscosity of at least 25,000 cP at 0.5% by weight polymer dosage. Preferably the amount of allyl ether cross-linker will be at least 1.5% by weight. The improved deicing fluid will have improved pseudoplasticity for passing the aerodynamic test, while providing improved re-freeze holdover time of at least 60 minutes and in many instances in excess of 80 minutes. Further, the deicing fluids of the present invention demonstrate good dilution stability when diluted by a ratio of up to 20:1, water to standard deicing fluid. The deicing fluids of the present invention also demonstrate good shear stability which is an important property as the fluid is spray applied.

DETAILED DESCRIPTION

The present invention, which is a thickened deicing fluid, is a combination of a glycol based aqueous solution and a cross-linked, carboxylic acid polymer or copolymer, which has a Brookfield mucilage viscosity of at least 25,000 centipoise at 0.5% by weight polymer, and an STI of greater than 20, while having a shear loss of less than 15%, when the polymer is used in a deicing fluid. This will allow deicing fluids containing a polymer in accordance with the present invention to achieve a holdover time of greater than 60 minutes, preferably greater than 80 minutes, and pass the aerodynamic test.

Typically, a thickened deicing or anti-icing composition (or fluid) essentially comprises the following:

a) from about 20 to about 70% by weight, preferably from about 40 to about 60% by weight, of at least one glycol,
b) from about 0.01 to about 5.0% by weight of polymeric thickener,
c) from 0.0 up to 2% by weight of at least one surfactant,
d) from 0.0 up to 1% by weight of at least one corrosion inhibitor for liquids based upon glycols and water,
e) from 0.0 up to 1% by weight of at least one basic compound for establishing a pH of from 7 to 11,
f) up to 1% by weight of other typical deicing fluid additives, such as antioxidants, chelating agents, and the like, and
g) water as the remainder up to 100% by weight. The weight percentages are based upon the total composition or deicing fluid. The deicing fluid is prepared by mixing together the individual components, in any desired order, in a vessel equipped with a stirrer or mixer.

Unless defined otherwise, all technical and scientific terms used herein shall have the same meaning as is commonly understood by one of skill in the art to which this invention pertains.

The term "carboyxlic acid polymers" is meant to include cross-linked homopolymers of carboxylic acid-containing monomers, copolymers containing a substantial amount (>20% by weight) of polymerized carboxylic acid monomer units, or cross-linked homopolymers or copolymers of monomers which can readily be converted to carboxylic acid-containing groups. Illustrative (but not meant to be limiting) of monomers which fall into this latter group are anhydride monomers such as maleic anhydride, citraconic anhydride, or itaconic anhydride and easily hydrolyzable monomers such as trimethylsilyl acrylate. The term carboxylic acid polymer is also taken to include salt forms of such polymers where the salt of the polymer is formed by post-polymerization reaction with ammonia, amine or alkali metal or alkaline earth base. Alternatively, a carboxylic acid monomer may be converted to a salt form by reaction with ammonia, amine or alkali metal or alkaline earth base and then converted to a carboxylic acid polymer by any one of the known polymerization methods.

The polymeric thickener employed in the present invention is a cross-linked, carboxylic acid polymer or copolymer, which is used in amount of about 0.001 to about 10% by weight based upon the weight of the coating composition. The range of about 0.01 to about 5% by weight is preferred, with the range of about 0.05 to about 2% by weight being further preferred. The amount of thickener or rheology modifier employed is not critical, but it must be enough to be effective to achieve the target viscosity. It will vary between about 0.2 and 2.0% by weight based upon the viscosity it generates in the final deicing fluid. Enough is used to produce a thickened fluid with viscosity targets of about 20,000 cP at 0.3 rpm and about 1,000 cP at 30 rpm, as measured by a Brookfield RVDV-II+ viscometer, using a 2 or 3 spindle, at 20° C. These viscosity targets are part of the thickener performance requirements in order for the fluid to pass aerodynamic tests in the temperature ranges of −30° C. to +20° C. This is usually done experimentally.

The cross-linked, carboxylic acid (co)polymer is the polymerization product of about 80 to about 100% by weight of an olefinically unsaturated carboxylic acid or anhydride monomer containing at least one activated carbon to carbon olefinic double bond and at least one carboxyl group, about 0 up to about 30% by weight of at least one hydrophobic monomer, and about 0.001 up to about 10.0% by weight of a cross-linking monomer. When the carboxylic acid monomer is an anhydride monomer, it will be present in the amount of about 25% to about 80% by weight. When the carboxylic acid monomer present is maleic anhydride, it will typically be copolymerized with an olefinic comonomer selected from the group consisting of α-olefins ($C_2$ to $C_{18}$). vinyl esters where the total number of carbon atoms in in the range of 3 to 21, or vinyl ethers where the total number of carbon atoms is from 3 to 21.

The carboxylic acid monomers containing at least one activated >C=C< group and carboxyl group, such as acrylic acid, methacrylic acid, maleic acid, itaconic acid, maleic anhydride, and the like. The preferred carboxylic acid is acrylic acid.

The hydrophobic monomers which could be employed include alkyl (meth)acrylate(s),where the alkyl group is selected from $C_6$ to $C_{30}$, alkyl vinyl ester(s) of $C_1$ to $C_{20}$ aliphatic acids, acrylamides having the formula $CH_2=CHCONR_1R_2$, where $R_1$ and $R_2$ can be H or a $C_1$ to $C_{20}$ alkyl group, or vinyl ether(s), having a formula $CH_2=CR_1-OR_2$, where $R_1$ can be H or $CH_3$ and $R_2$ is $C_1$ to $C_{18}$ hydrocarbyl group or a styrenic, which would include acrylate esters, acrylamides, alkylated acrylamides, olefins, vinyl esters, vinyl ethers, α-olefins, or styrenics. Representative higher alkyl acrylic esters are decycl acrylate, lauryl acrylate, stearyl acrylate, behenyl acrylate and melissyl acrylate, and the corresponding methacrylates. When the carboxylic acid monomer is an anhydride monomer, the hydrophobic monomer is preferably selected from α-olefins, vinyl esters and vinyl ethers. It is preferred that at least one hydrophobic monomer be incorporated in the polymer, although there is no criticality in a particular hydrophobic monomer. Enough hydrophobic monomer should be incorporated to be effective to provide a holdover time of greater than 60 minutes, which amount will usually range from about 0.001% by weight up to 30% by weight, with the range of about 1% up to about 5.0% being preferred. The preferred hydrophobic monomers are lauryl methacrylate, isodecyl methacrylate, stearyl methacrylate, tertiary butyl acrylamide, tertiary octyl acrylamide, vinyl acetate, and vinyl esters of $C_1$ to $C_{20}$ aliphatic acids.

Homopolymers of acrylic acid are described, for example, in U.S. Pat. No. 2,798,053. The method of making hydrophobically modified acrylic acid polymers are described, for example, in U.S. Pat. Nos. 4,421,902, 3,915,921, 4,509,949, 4,923,940, 4,996,274, 5,004,598, and 5,349,030. These polymers have a large water-loving portion (the acrylic acid portion) and a smaller oil-loving portion (which can, e.g., be derived from a long chain alkyl (meth)acrylate esters and long chain vinyl alkyl esters). These polymers are prepared in a reaction medium such as hydrocarbon solvents, halogenated hydrocarbon solvents, aromatic solvents, ketones, esters, ethers, alcohols, and mixtures thereof. The amounts of the monomers are based on the combined weight of the monomer components. It should be understood that more than one carboxylic monomer and more than one acrylate ester or vinyl ester or ether or styrenic can be used in the monomer charge. Also useful are interpolymers of hydrophobically modified monomers and steric stabilizing polymeric surface active agents having at least one hydrophilic moiety and at least one hydrophobic moiety or a linear block or random comb configuration or mixtures thereof. Examples of steric stabilizers which can be used are Hypermer®, which is a (12-hydroxystearic acid) polymer, available from Imperial Chemical Industries Inc., Pecosil®, which is a methyl-3-polyethoxypropyl siloxane-Ω-phosphate polymer, available from Phoenix Chemical, and low molecular weight block copolymers of ethylene oxide, propylene oxide, and the like. Use of steric stabilizers such as these are taught by U.S. Pat. Nos. 4,203,877 and 5,349,030, the disclosures of which are incorporated herein by reference.

The polymers can be cross-linked in a manner known in the art by including, in the monomer charge, a suitable cross-linking monomer in amount of about 0.001 to 4%, preferably 1.5 to 4% by weight based on the combined weight of the carboxylic monomer and the comonomer(s). The cross-linking monomer is selected from polymerizable monomers which contain a polymerizable vinyl or $CH_2=C<$ group and at least one other polymerizable group, such as a polyalkenyl polyether of a parent alcohol containing more than one alkenyl ether group per molecule wherein the parent alcohol contains at least 2 carbon atoms and at least 2 hydroxyl groups. The preferred cross-linking monomers are allyl pentaerythritol, allyl sucrose, trimethylolpropane diallyl ether, allyl acrylate, polyacrylate esters, methylene-bis-acrylamide, or mixtures thereof. The precise amount of cross-linking monomer to be used will vary depending on the monomer selected. What is important is that an effective amount of cross-linking monomer be used such that the polymer will have a mucilage viscosity, measured by a Brookfield viscometer, of at least 25,000 cP, with at least 40,000 cP being preferred, and produce a deicing fluid that will have a shear thining index of at least 20; shear loss of less than 15%, a holdover time of at least 60 minutes and pass the aerodynamic test. This can be achieved by employing at least 1.5% cross-linking monomer when the cross-linking monomer is polyalkynyl ether of polyalcohols. There also is no criticality in the maximum amount of cross-linking monomer to be used, however, as is typical for cross-linked polymers, too much cross-linking monomer can produce an "over cross-linked" polymer.

Polymerization of the carboxyl-containing monomers is usually carried out in the presence of a free radical initiator in a closed vessel in an inert atmosphere under autogenous or artificially-induced pressure, or in an open vessel in an inert atmosphere optionally under reflux at atmospheric pressure. The temperature of the polymerization may be varied from about 0° to 125° C. or lower or higher. Polymerization at 25° to 90° C. using a free radical initiator is generally effective in providing monomer to polymer conversions of 75 percent to 100 percent.

The polymerizations may be done using either precipitation polymerization, dispersion polymerization, or inverse emulsion or suspension polymerization, via batch, semi-batch or continuous polymerization, and using typical free-radical forming initiators and typical solvents. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 20 hours.

A wide variety of glycols may be employed in fluids of the present invention. Typically, these will be alkylene glycols having 2 to 3 carbon atoms and oxyalkylene glycols having 4 to 6 carbon atoms. This would include ethylene glycol, propylene glycol, diethylene glycol, dipropylene glycol, or mixtures thereof. It is noted that the present invention performs particularly well with propylene glycol.

Additional ingredients which are employed in the deicing fluids of the present invention include those typically found in deicing fluids. These include surfactants, such as fatty alcohol alkoxylates, arylalkylsulfonates, or mixtures thereof, corrosion inhibitors, anti-oxidants, chelating agents, and pH regulators for establishing a pH of from about 7 to about 11.

In order to illustrate the present invention, examples of deicing compositions were made and tested in accordance with the test protocols noted below to determine the characteristics of the composition, especially the pseudoplastic character of the composition and the composition was employed as a deicing fluid to evaluate holdover times and aerodynamic performance. As contrast, values for some commercial thickeners and the reported values from the discussed prior art patents are presented in Table I. In the testing, a deicing fluid thickened using various polymers, and based upon the following composition, was tested:

| DEICING FLUID COMPOSITION A | | |
|---|---|---|
| Ingredient | % by weight | Function |
| Deionized (DI) Water | 48.0 | Solvent/diluent |
| Polymer (Thickener) | 0.2–2.0 | Thickener/rheology modifier |
| Alkali Metal Hydroxide Neutralizing Agent (20%) (KOH, NaOH, etc) | q.s. To pH 8 | Neutralizing agent |

-continued

DEICING FLUID COMPOSITION A

| Ingredient | % by weight | Function |
| --- | --- | --- |
| Antifreeze (1,2-Propylene Glycol) | 50.0 | Antifreeze |
| Anionic or Nonionic Surface Active Agent (E.g., 40% Sodium Linear Alkylbenzene Sulfonate Soln.) | 0.5 | Wetting agent/detergent |
| Corrosion Inhibitor (Potassium Phosphate Dibasic) | 0.07 | Stabilizer/corrosion inhibitor |

As noted earlier, the amount of thickener or rheology modifier employed is not critical, but it must be enough to be effective to achieve the target viscosity. It will vary between about 0.2 and 2.0% by weight based upon the viscosity it generates in the final deicing fluid. Enough is used to produce a thickened fluid with viscosity targets of about 20,000 cP at 0.3 rpm and about 1,000 cP at 30 rpm, as measured by a Brookfield RVDV-II+ viscometer, using a 2 or 3 spindle, at 30° C. These viscosity targets are part of the thickener performance requirements in order for the fluid to pass aerodynamic tests in the temperature ranges of −30° C. to +20° C. This is usually done experimentally. Further, the deicing composition is evaluated as a deicing fluid for its holdover time and aerodynamic performance values. The deicing fluid will contain the additional compositions typically found in deicing fluids, but which do not materially affect the performance, such as corrosion inhibitors and the like.

PERFORMANCE INDICATORS

The performance of deicing and anti-icing fluids are established through two key ISO standard tests (SAE AMS 1428a), namely the Holdover Time, as measured by the Water Spray Endurance Test (or WSET), and the Aerodynamic Performance Test. However, the fluid also has to pass other tests as specified by SAE/AMS. These tests include pH, viscosity requirements at various temperatures, dilution stability, shear stability, storage stability, physical properties of the bulk material, flash point, specific gravity, refraction index, corrosion of metals, hydrogen embrittlement, effect on transparent plastic, effect on unpainted surfaces, exposure to dry air, thermal stability, biodegradability, surface tension, and slipperiness. References for requirements, specifications, and test procedures of the above listed tests can be found in AMS 1428, 1427, 1426, MIL-A-8243, MIL-C-25769, ASTM D93, F503, D445, D891, D1121, D1296, D1177, and D1331.

For this invention, in addition to the holdover time and aerodynamic performance tests, we have conducted rheological property tests, namely Shear Thinning index (STI) and Shear Stability; in order to determine if the fluid exhibits a non-newtonian flow behavior.

Shear Thinning Index or STI—This indicator is the number ratio of the rheological properties or viscosity of the thickened deicing fluid at 0.3 rpm compared to the viscosity at 30 rpm. A higher STI is considered to be better. This is not a required or standard test, but it is predictive of the Aerodynamic Test result. It is a measure of the shear thinning nature of the composition. The fluid should exhibit a non-Newtonian flow. The rheological properties or viscosity of the thickened deicing fluid are measured according to ASTM D2196-81 Method B, using a Brookfield Type LVT viscometer, and a No. 1 or 2 spindle, at a temperature of between −30° and +20° C. Three measurements are made at 0.3 revolutions per minute (rpm), 6 rpm, and 30 rpm. The results are reported in centipoise (cP).

Shear Stability—The shear stability or shear loss, expressed as a percentage (%), is the alteration of the rheological properties of the fluid when the thickened fluid is subjected to pumping and spraying. The lower the shear loss the better. It is desirable that the viscosity fluid not be altered by more than +/−20% from its unsheared viscosity. To subject the fluid to shear, which simulates the actual spray conditions, 500 ml of fluid, at 20° C., is placed in a 800 ml glass beaker and subjected to 5 minutes of agitation using a Brookfield counter rotating mixer at 3,500 rpm, while the blade is 25 mm from the bottom of the beaker. The fluid is allowed to deaerate during a period of up to 24 hours after shearing, before being further tested. The results are reported as the average viscosity loss after shear, expressed as a percentage of the viscosities at 0.3, 6, and 30 rpm.

Holdover Time—The holdover time is the minimum time the deicing fluid provides ice and snow protection before it is necessary to re-spray it with new deicing fluid, while the aircraft (for example) is on the ground. A higher holdover time is better. The water spray endurance test or WSET, which is also called the freezing rain endurance test, is one measure of holdover time. The high humidity holdover or endurance test (HHET) is sometimes used in place of WSET. Each of these tests is designed to simulate the exposure of an aircraft to rime or frost conditions. In these tests, the deicing fluid is applied on a sloped metal surface or test plate and exposed to low temperature while high humid air or simulated rain is passed over the test surface. The time lapse to when it is noted that freezing begins on the test plate is measured and recorded. The test parameters for the water spray endurance test are as follows:

Procedure for Freezing Rain Endurance Test (WSET)

In this test, under simulated conditions, a surface, such as is found on aircraft, is exposed to rain when the air temperature and the aircraft skin temperature are below 0° C. The rain is simulated by supplying water at constant pressure through nozzles producing a rain mist of specified droplet size distribution and intensity, as follows:

Air temperature: maintained at −5° C.±0.5° C.

Panel temperature: maintained at −5° C.±0.5° C.

Test panel slopes: 10°±0.2°

Rain droplet size at the level of the test panel: average droplet size 20 µm and 50% of droplets diameter will be in the range of 15 to 35 µm Rain intensity: 5±0.2 g/dm$^2$ per hour The fluids after shearing by a laboratory equipment in accordance with the shear stability test, are applied by pouring at −5° C.±0.5° C. evenly on the test panels and allowed to stabilize for five minutes. Rain droplets are applied in an evenly controlled flow pattern and the effect on the fluid surfaces is observed. After a defined period, the ice adhesion, if any, on the fluid surfaces is examined. The rain intensity during the test period is measured by weighing the ice formed on a blank control panel. The time to produce freezing up to 2.5 cm at the upper end of the test panel is recorded.

After a test duration of minimum 30 minutes, the test panel shall not show any freezing beyond 2.5 cm at the upper end of the test panel. At the end of 120 minutes, the test is ended, so the maximum holdover time that is recorded is 120 minutes.

Aerodynamic Test—The aerodynamic test is a test performed in a wind tunnel to make sure that all of the deicing fluid is removed from the wings of the aircraft, if that is what is being evaluated, before the aircraft takes-off. This is a pass/fail test. In this test, the test deicing fluid is sprayed on a wing model configuration, and the wind speed is increased from idle to 70 meter per second, which approximates the top speed during the take-off of an aircraft. The top speed is achieved in 30 seconds, and the fluid has to be completely removed from the model configuration in less than 30 seconds, typically with in the first 20-25 seconds. The test is conducted with air temperatures ranging from $-30°$ C. to $+10°$ C.

In addition to the above standard tests, the deicing fluids of the present invention were evaluated to determine their shelf stability and dilution stability in accordance with ASTM F503. In this evaluation, the fluid shall neither show any separation from exposure to heat or cold nor show an increase in turbidity compared to a fresh control. A standard fluid, having a 50:50 ratio of glycol to water, is also diluted with hard water (Ref. MIL-C.25769) in a ratio of 1:1, water to standard fluid and stored at 95° C. for a minimum of 30 days. At the end of this period, a visual inspection and pH measurement is performed and the results compared with those of the fresh sample. In addition to the above stability requirements, the deicing fluids were stored at 70° C. for 30 days and tested for pH and viscosity.

polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

| Example 12 | | | | | |
|---|---|---|---|---|---|
| Viscosity (mpa) | | | Shear Loss | Holdover Time | Aerodynamic |
| 0.3 rpm | 30 rpm | STI | (%) | (min) | Test |
| 21,330 | 907 | 24 | 2 | 75 | pass |

TABLE I

| Example Number | Polymer Dosage (%) | Polymer | Mucilage Viscosity (cP) | STI | Shear Loss (%) | Holdover time (minutes) | Aerodynamic test |
|---|---|---|---|---|---|---|---|
| 1 | 0.4 | Carbopol 934 polymer | 25,000-40,000 | 10 | 10 | 26 | Pass |
| 2 | 0.3 | Carbopol 1621 polymer | 8,000-15,000 | 20 | 40 | 35 | Pass |
| 3 | 0.3 | Carbopol 1623 polymer | 20,000 | 19 | 19 | | |
| 4 | | USPN 5,461,100 | — | 31 | 11 | 70 | Pass |
| 5 | | USPN 4,358,389 | 1,000-50,000 | — | — | 35 | Pass |
| 6 | | USPN 4,744,913 | 10,000-50,000 | — | — | 37 | Pass |
| 7 | | USPN 5,118,435 | 19,000-40,000 | 7 | — | 35 | Pass |
| 8 | | USPN 5,268,116 | 50,000-70,000 | 10 | — | 26 | Pass |
| 9 | | USPN 5,268,117 | 10,000-50,000 | 13 | — | 28 | Pass |
| 10 | | USPN 5,334,323 | 5,000-60,000 | 8 | — | 26 | Pass |
| 11 | | CA PA 2,147,046 | 1,000-20,000* | 8 | — | 34 | Pass |

In Table I, all the viscosities were measured at 20 rpm and in 0.5% by weight polymer aqueous solution, except as noted for example 11 which is measured in a 0.2% polymer solution. The amounts shown for the polymer is the weight percent of the polymer based upon the total weight of the deicing fluid. Examples 1, 2, and 3 are commercial thickeners available from the BF Goodrich Company. Example 1 is a cross-linked homopolymer of acrylic acid, while Examples 2 and 3 are cross-linked copolymers of acrylic acid and a $C_{10}$ to $C_{30}$ alkyl acrylate. Examples 4 to 11 report information taken from or based on the examples in the respective patent literature.

EXAMPLE 12

A type IV aircraft anti-icing fluid based upon Composition A was prepared as follows:

0.50% by weight of cross-linked hydrophobically modified carboxylic acid copolymer comprising 96.7% by weight of polymerized acrylic acid, 1.50% by weight of stearyl methacrylate, and 1.80% by weight of allyl pentaeythritol, which copolymer has a Brookfield mucilage viscosity of 84,000 cP at 0.5% by weight

EXAMPLE 13

A type IV aircraft anti-icing fluid based upon Composition A was prepared as follows:

0.50% by weight of cross-linked hydrophobically modified carboxylic acid copolymer comprising 96.9% by weight of polymerized acrylic acid, 1.50% by weight of stearyl methacrylate, and 1.60% by weight of allyl sucrose, which has a Brookfield mucilage viscosity of 25,200 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

| Example 13 | | | | | |
|---|---|---|---|---|---|
| Viscosity (mpa) | | | Shear Loss | Holdover Time | Aerodynamic |
| 0.3 rpm | 30 rpm | STI | (%) | (min) | Test |
| 24,530 | 971 | 25 | 3 | 61 | pass |

EXAMPLE 14

A type IV aircraft anti-icing fluid based upon Composition A was prepared as follows:

0.50% by weight of cross-linked hydrophobically modified carboxylic acid copolymer comprising 96.6% by weight of polymerized acrylic acid, 1.50% by weight of stearyl methacrylate, and 1.95% by weight of allyl pentaerythritol, which copolymer has a Brookfield mucilage viscosity of 62,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

| Example 14 | | | | | |
|---|---|---|---|---|---|
| Viscosity (mpa) | | | Shear Loss | Holdover Time | Aerodynamic |
| 0.3 rpm | 30 rpm | STI | (%) | (min) | Test |
| 22,500 | 892 | 25 | 10 | 110 | pass |

EXAMPLE 15

A type IV aircraft anti-icing fluid based upon Composition A was prepared as follows:

0.50% by weight of cross-linked hydrophobically modified carboxylic acid copolymer comprising 96.6% by weight of polymerized acrylic acid, 1.50% by weight of stearyl methacrylate, and 1.90% by weight of allyl pentaerythritol, which copolymer has a Brookfield mucilage viscosity of 52,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

| Example 15 | | | | | |
|---|---|---|---|---|---|
| Viscosity (mpa) | | | Shear Loss | Holdover Time | Aerodynamic |
| 0.3 rpm | 30 rpm | STI | (%) | (min) | Test |
| 25,100 | 960 | 26 | 9 | 120 | pass |

EXAMPLE 16

A type IV aircraft anti-icing fluid based upon Composition A was prepared as follows:

0.50% by weight of cross-linked hydrophobically modified carboxylic acid copolymer comprising 96.5% by weight of polymerized acrylic acid, 1.50% by weight of stearyl methacrylate, and 2.00% by weight of allyl pentaerythritol, which copolymer has a Brookfield mucilage viscosity of 44,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

| Example 16 | | | | | |
|---|---|---|---|---|---|
| Viscosity (mpa) | | | Shear Loss | Holdover Time | Aerodynamic |
| 0.3 rpm | 30 rpm | STI | (%) | (min) | Test |
| 22,000 | 926 | 24 | 6 | 120 | pass |

EXAMPLE 17

A type IV aircraft anti-icing fluid based upon Composition A was prepared as follows:

0.50% by weight of cross-linked hydrophobically modified carboxylic acid copolymer comprising 96.8% by weight of polymerized acrylic acid, 1.50% by weight of stearyl methacrylate, and 1.70% by weight of allyl sucrose, which copolymer has a Brookfield mucilage viscosity of 29,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 17

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 23,300 | 1200 | 19 | 4 | 75 | FAIL |

EXAMPLE 18

A type IV aircraft anti-icing fluid based upon Composition A was prepared as follows:

0.50% by weight of cross-linked hydrophobically modified carboxylic acid polymer comprising 98.4% by weight of polymerized acrylic acid and 1.60% by weight of allyl sucrose, which polymer has a Brookfield mucilage viscosity of 28,200 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 18

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 21,330 | 907 | 24 | 3 | N/T | N/T |

EXAMPLE 19

A type IV aircraft anti-icing fluid based upon Composition A was prepared as follows:

0.62% by weight of cross-linked hydrophobically modified carboxylic acid copolymer comprising 96.6% by weight of polymerized acrylic acid, 1.50% by weight of stearyl methacrylate, and 1.90% by weight of allyl sucrose, which copolymer has a Brookfield mucilage viscosity of 27,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 19

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 23,460 | 907 | 26 | 3 | N/T | N/T |

EXAMPLE 20

A type IV aircraft anti-icing fluid based upon Composition A was prepared as follows:

0.51% by weight of cross-linked hydrophobically modified carboxylic acid copolymer comprising 95.6% by weight of polymerized acrylic acid, 3.00% by weight of stearyl methacrylate, and 1.40% by weight of allyl pentaerythritol, which copolymer has a Brookfield mucilage viscosity of 82,500 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 20

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 23,460 | 971 | 24 | 3.6 | N/T | N/T |

EXAMPLE 21

A type IV aircraft anti-icing fluid based upon Composition A was prepared as follows:

0.57% by weight of cross-linked hydrophobically modified carboxylic acid copolymer comprising 95.6% by weight of polymerized acrylic acid, 3.00% by weight of stearyl methacrylate, and 1.40% by weight of allyl pentaerythritol, which copolymer has a Brookfield mucilage viscosity of 73,000 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 21

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 20,260 | 907 | 22 | 4.1 | N/T | N/T |

EXAMPLE 22

A type IV aircraft anti-icing fluid based upon Composition A was prepared as follows:

0.55% by weight of cross-linked hydrophobically modified carboxylic acid copolymer comprising 96.9% by weight of polymerized acrylic acid, 1.50% by weight of stearyl methacrylate, and 1.60% by weight of equal amounts of allyl sucrose and allyl pentaerythritol, which copolymer has a Brookfield mucilage viscosity of 38.250 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 22

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 19,200 | 811 | 24 | 9 | N/T | N/T |

EXAMPLE 23

A type IV aircraft anti-icing fluid based upon Composition A was prepared as follows:

0.85% by weight of cross-linked hydrophobically modified carboxylic acid copolymer comprising 95.5% by weight of polymerized acrylic acid, 1.50% by weight of stearyl methacrylate, and 3.00% by weight of equal amounts of allyl sucrose and allyl pentaerythritol, which copolymer has a Brookfield mucilage viscosity of 300 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 23

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 19,200 | 811 | 24 | 2.6 | N/T | N/T |

EXAMPLE 24

A type IV aircraft anti-icing fluid based upon Composition A was prepared as follows:

0.59% by weight of cross-linked hydrophobically modified carboxylic acid copolymer comprising 96.6% by weight of polymerized acrylic acid, 1.50% by weight of stearyl methacrylate, and 1.50% by weight of a combination of equal amounts of allyl pentaerythrital and allyl sucrose, which copolymer has a Brookfield mucilage viscosity of 26,800 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 24

| Viscosity (mpa) | | | Shear Loss | Holdover Time | Aerodynamic |
| --- | --- | --- | --- | --- | --- |
| 0.3 rpm | 30 rpm | STI | (%) | (min) | Test |
| 19,200 | 779 | 25 | 10.3 | N/T | N/T |

EXAMPLE 25

A type IV aircraft anti-icing fluid based upon Composition A was prepared as follows:

0.78% by weight of cross-linked hydrophobically modified carboxylic acid copolymer comprising 96.0% by weight of polymerized acrylic acid, 1.50% by weight of stearyl methacrylate, and 2.50% by weight of a combination of equal amounts of allyl pentaerythrital allyl sucrose, which copolymer has a Brookfield mucilage viscosity of 24,300 cP at 0.5% by weight polymer dosage, was dispersed in water at 20° C. by vigorous stirring. The potassium hydroxide solution was added while stirring to neutralize the copolymer. The 1,2-propylene glycol, surfactant, and corrosion inhibitor were added and the mixture was stirred until homogeneous.

The anti-icing composition obtained was tested for viscosity, STI, and shear stability. The composition was then used in a deicing fluid in order to perform water spray endurance time and aerodynamic performance tests in accordance to performance requirements for SAE Type IV fluids described in AMS 1428 A. The results are shown below:

Example 25

| Viscosity (mpa) | | STI | Shear Loss (%) | Holdover Time (min) | Aerodynamic Test |
|---|---|---|---|---|---|
| 0.3 rpm | 30 rpm | | | | |
| 17,060 | 811 | 21 | 1.3 | N/T | N/T |

As can be seen from the results in the examples, the thickened deicing fluids employing thickeners in accordance with the present invention achieve holdover times in excess of 60 minutes, with holdover times in excess of 80 minutes and even in excess of 100 minutes being achieved, which are in excess of the requirement for Type IV fluids. Holdover time tests and aerodynamic tests could not be run on all the polymers evaluated, and so these examples are reported as NTT (no test). But, these examples support the invention, and are expected to produce favorable holdover time and aerodynamic results. Deicing fluids employing thickeners in accordance with the present invention also met all of the stability requirements as described in the test procedure. The fluids and their dilutions showed no significant changes in pH, viscosity and turbidity after aging, compared to the initial fluid. These results can be contrasted with thickeners disclosed in the prior art, such as are used for Type II fluids, with holdover times of between 25 and 40 minutes. Also as perspective, the thickened fluid disclosed in U.S. Pat. No. 5,461,100, which is based upon the use of an associative thickener and which is a different mechanism than the cross-linked, carboxylic acid thickener of the present invention, achieves a holdover time of 70 to 80 minutes. The deicing fluids of the present invention achieve the required holdover times and aerodynamic performance by employing a polymeric thickener which is a cross-linked, hydrophobically modified polymer, which has a mucilage viscosity of at least 20,000 cP, and which achieves a performance of at least 20 in the STI test, with less than 15% shear loss. The preferred performance for the deicing fluid in accordance with the present invention was achieved when the thickening polymer had a mucilage viscosity of at least 40,000 cP, and an STI of at least 25, with a shear loss of less than 12% (with less than 10% being further preferred), in the thickened fluid.

The deicing fluid according to the invention easily meets the requirements for Type IV deicing fluids as described above. Even if the deicing fluid has a high viscosity at rest (yield value), which ensures a long holdover time, the novel thickener achieves unexpectedly good flow-off characteristics. Using the novel thickener, therefore, it is possible to resolve the conflict between the two properties of holdover time and flow-off characteristics. This surprising result apparently stems from the unexpectedly pronounced pseudoplastic behavior of the thickener described, which leads to a marked decrease in viscosity as shear increases and consequently to the low layer thickness required of the film of deicing composition in the aerodynamic acceptance test.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What I claim is:

1. A thickened composition for use as a de-icing fluid comprising a glycol based aqueous solution thickened with about 0.01 to about 5.0% by weight of at least one cross-linked, carboxylic acid polymer, which has a mucilage viscosity of at least 25,000 cP at 0.5% by weight polymer dosage, and a shear thinning index of at least 20, and a shear loss of less than 15% when used to thicken the deicing fluid, whereby said fluid will have a holdover time of at least 60 minutes and acceptable aerodynamic performance.

2. The composition of claim 1 wherein said carboxylic acid polymer is an acrylic acid homopolymer.

3. The composition of claim 1 wherein said carboxylic acid polymer is an acrylic acid copolymer.

4. The composition of claim 1 wherein said carboxylic acid polymer is selected from the group consisting of mixtures of acrylic acid homopolymers, mixtures of acrylic acid copolymers, and mixtures of acrylic acid homopolymers and copolymers.

5. The composition of claim 1 wherein said carboxylic acid polymer is a copolymer of carboxylic acid and a hydrophobic monomer selected from the group consisting of alkyl (meth)acrylate(s) having a C6 to C30 alkyl group, acrylamides, alkyl aryl (meth)acrylates, and vinyl monomers.

6. The composition of claim 1 wherein said carboxylic acid polymer is a copolymer of maleic anhydride and a monomer selected from the group consisting of alkyl vinyl ethers, vinyl esters, and α-olefins, and mixtures thereof, and wherein the cross-linked, polycarboxylic acid polymer is cross-linked with a crosslinking monomer selected from the group consisting of trivinyl cyclohexane, divinyl benzene, allyl ethers, dienes of $C_6$ to $C_{12}$, and mixtures thereof.

7. The composition of claim 1 wherein said carboxylic acid polymer is a copolymer of maleic anhydride and at least one α-olefin.

8. The composition of claim 5 wherein said hydrophobic monomer is present in an amount of between about 0.1 to 30% by weight based upon the weight of the polymer.

9. The composition of claim 5 wherein said hydrophobic monomer is present in an amount of between about 1 and 5% by weight based upon the weight of the polymer.

10. The composition of claim 5 herein said hydrophobic comonomer is selected from the group consisting of stearyl methacrylate, lauryl methacrylate, isodecyl methacrylate, vinyl esters of $C_1$ to $C_{20}$ aliphatic acids, lauryl methacrylate, isodecyl methacrylate, tertiary butyl acrylamide, tertiary octyl acrylamide, and vinyl acetate.

11. The composition of claim 5 wherein said hydrophobic comonomer is a vinyl ester of a $C_9$ or $C_{10}$ aliphatic acid.

12. The composition of claim 1 wherein said cross-linked, polycarboxylic acid polymer is cross-linked with a cross-linking monomer present in an amount of between about 0.001 and 10.0% by weight based upon the weight of the polymer.

13. The composition of claim 1 wherein said cross-linked, polycarboxylic acid polymer is cross-linked with a cross-linking monomer present in an amount of at least 1.0% by weight based upon the weight of the polymer.

14. The composition of claim 1 wherein said cross-linked, polycarboxylic acid polymer is cross-linked with a cross-linking monomer selected from the group consisting of allyl pentaerythritol, allyl sucrose, trimethylolpropane diallyl ether, allyl acrylate and mixtures thereof.

15. The composition of claim 1 wherein said cross-linked, polycarboxylic acid polymer is cross-linked with a cross-linking monomer which is tri-vinyl cyclohexane and dienes of $C_6$ to $C_{12}$ and is in an amount of between about 2% and 6% by weight based upon the weight of the polymer.

16. The composition of claim 1 wherein said cross-linked, polycarboxylic acid polymer is cross-linked with a cross-linking monomer which is polyethylene glycol diallyl ether and is in an amount of between about 2% and 6% by weight based upon the weight of the polymer.

17. The composition of claim 1 wherein said cross-linked, polycarboxylic acid polymer is cross-linked with a cross-linking monomer which is allyl acrylate and is in an amount of between about 1% and 4% by weight based upon the weight of the polymer.

18. The composition of claim 1 wherein the shear thinning index is greater than 22.

19. The composition of claim 1 wherein the shear thinning index is greater than 25.

20. The composition of claim 1 wherein the holdover time is at least 80 minutes.

21. The composition of claim 1 wherein the mucilage viscosity is greater than 40,000 centipoise.

22. The composition of claim 1 wherein the glycol is selected from the group consisting of ethylene glycol, propylene glycol, diethylene glycol, and mixtures thereof.

23. The composition of claim 1 wherein the glycol is propylene glycol.

24. The composition of claim 1 wherein the fluid comprises glycol and water in a weight ratio of between about 40:60 and about 80:20, glycol to water.

25. The composition of claim 1 wherein the composition further contains an antioxidant.

26. The composition of claim 1 wherein the composition further contains a chelating agent.

27. The composition of claim 1 wherein the composition further contains an additive selected from the group consisting of dye(s), corrosion inhibitor(s), surfactant(s), and combinations thereof.

28. The composition of claim 1 wherein the thickened composition further has a pH of between about 6 and 12.

29. The composition of claim 1 wherein the shear loss is less than 10%.

30. A process of preventing and/or delaying a surface, which is subject to exposure to moisture and subsequent freezing, from developing ice, comprising applying to said surface an effective amount of the deicing composition of claim 1 to prevent and/or delay a surface from developing ice.

31. The process of claim 21 wherein the surface is the exposed metal surface of an aircraft.

32. The process of claim 21 wherein the surface is the exposed glass surface of an autoniotive windshield.

33. The process of claim 21 wherein the surface is the exposed glass surface of a train windshield.

\* \* \* \* \*